United States Patent Office 3,280,077
Patented Oct. 18, 1966

3,280,077
RESINOUS COMPOSITIONS COMPRISING EPOXY RESINS AND POLYESTER-ETHER COPOLYMERS HAVING ACIDIC END GROUPS
Leslie C. Case and Laura K. Case, both of 14 Lockeland Road, Winchester, Mass.
No Drawing. Filed Dec. 10, 1962, Ser. No. 243,638
14 Claims. (Cl. 260—75)

This invention relates to novel resinous compositions and, in particular to epoxy-cured resin formulations. More specifically, this invention is concerned with resinous compositions comprising epoxy resins and novel polyester-ether copolymers having acidic end groups. These new compositions cure to tough, hard, infusible resins with excellent physical and chemical properties. They are useful in producing castings, surface coatings, and as components in laminates and foams.

This application is a continuation-in-part of our copending application Serial No. 168,062 filed January 23, 1962 now abandoned.

Epoxy resins are widely used as components in paints and adhesives, as casting and molding materials, and as a component of laminated structures. They are very useful because of their ability to be readily and inexpensively convertible to hard, infusible products with excellent chemical resistance. Epoxy resins are, however, quite expensive in comparison to competing materials and their relatively high cost has restrained growth in many applications. In addition, the products made from them are frequently quite brittle. The usefulness of such brittle compositions is necessarily limited. Attempts to improve this property, that is to increase toughness and flexibility, have generally only been accomplished by impairing hardness and electrical properties, and by decreasing resistance to chemical attack.

Epoxy resins are compounds containing at least two terminal epoxide groups in each molecule and, in general, they have a high content of aromatic or other ring structures in the molecule. These rigid structures contribute in large measure to the hardness of the final product. Epoxy resins can be converted into hard, insoluble, infusible materials—a process termed curing—by reaction with a crosslinking agent—referred to as a curing agent—which enters into reaction with the epoxide groups and joins together the epoxy resin polymer chains through crosslinks. Suitable crosslinking agents are compounds which are polyfunctional in such groups as —NH₂, —SH, —CONH₂, —COOH, and —COOCO—. Such groups react with the epoxide groups and thereby form links between molecules of the polyepoxide. In order to be readily curable to a hard material the conventional epoxy resin formulation must contain a large proportion by weight of the expensive epoxy resin component and a relatively small amount of the curing agent. Lower epoxy resin contents without a decrease in curability and in the hardness of the cured product would be desirable.

We have found that insoluble, infusible resins, which are hard and tough, instead of brittle, can be formed from compounds containing at least two epoxide groups and novel inexpensive polyester-ether copolymers of the type described in our copending application Serial No. 168,062. These novel resin formulations, which result in cured products with excellent chemical and physical properties, can be made with a much lower content of the expensive epoxy resin component than formulations known to the art. Since these novel compositions contain less than 50 percent by weight of epoxy resin, they are properly classified as epoxy resin cured polyester-ether copolymers rather than as cured epoxy resins.

The copolymers useful in the present invention are high-molecular-weight, thermoplastic polymers of suitably low melt viscosity, so as to permit handling and mixing at or near room temperature. They contain ester and ether linkages in substantial and random proportions and have a significant amount of aromatic or other rigid ring structures incorporated into the polymer chain backbone along with aliphatic segments, the said polymer chains having carboxylic acid end groups. These polymers may therefore be broadly defined as stiff-backbone, acid-terminated polyester-ether copolymers.

For purposes of this invention these stiff-backbone polyester-ether copolymers should have a minimum of two carboxyl end groups, and preferably at least three, and frequently not above eight carboxylic acid end groups, that is, the polymer should be at least difunctional, and preferably have a functionality of at least three, and generally not above eight.

Useful copolymers can be represented by the following schematic formula:

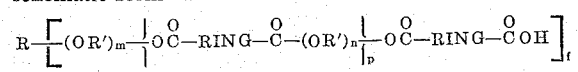

where RING represents a cyclic or polycyclic hydrocarbon group which can be aromatic or partially or fully saturated, R represents the residue of a polyhydric compound with a hydroxyl functionality of $f$, $f$ being an integer of two or more, R′ is a straight- or branched-chain lower alkylene of at least two carbons, $m$ varies from a minimum value of zero to a maximum value of about ten, with the statistically average value being about 1.5, $n$ has a value of at least one and generally not more than fifteen, its statistically average value being about 2.5, $p$ has a value of zero or greater, the average value being determined by the molecular weight desired.

Particularly useful copolymers are those in which RING is 1,2-phenylene, 1,2-cyclohexylene, hexachlorobicycloheptylene and 3,4,5,6-tetrachloro-1,2-phenylene, and R′ is ethylene, 1,2-propylene, and 1,2-butylene.

Polyester-ether copolymers useful in this invention should have a molecular weight per chain end of at least about 200 and generally not above 2000, the molecular weight of the polymer being determined by the functionality—that is, the number of chains per polymer molecule—and the molecular weight per chain end. The acid number, that is, the milligrams of potassium hydroxide equivalent to one gram of polymer, should not exceed a maximum value of about 250, and should advisably not be above 200, with the preferred range being about 50 to about 100. In addition, the copolymers should have a low hydroxyl number. For the individual polymers the hydroxyl number is desirably not greater than about ten percent of the respective acid number.

In the preparation of a cured resin from a polyester-ether copolymer and a polyepoxide it is important that the polyester-ether copolymer have a low hydroxyl number relative to the acid number. Since carboxyl groups are more reactive with epoxide groups than are hydroxyl groups, the cure rate is lowered if a large amount of hydroxyl groups is present. Also, a large amount of hydroxyl end groups interferes with the course of the cure and may lead to an improperly cured product.

The stiff-backbone, acid-terminated polyester-ether copolymers useful in this invention should contain an average of about 1.0 to about 5.0, and advisably at least an average of 2.0 gram mols of ring structures per kilogram of polymer. The weight of the chain-incorporated ring residues, excluding ester groups attached thereto, but including all other ring substituents, should be in the region of 15 percent to 75 percent by weight of the final copolymer, with the lower part of the range being for lighter rings, such as phenylene or cyclohexylene, and the higher part of the range for heavy rings such as halogenated ones.

The polymers should also contain an average of about 1.0 or more ether oxygens per aliphatic chain segment, viz between ester linkages. Otherwise stated, the average degree of polymerization in the ether group is about two or higher. The acyclic main polymer-chain segments between non-carbonyl ester oxygen atoms (excluding any pendant side chains) should contain an average of from four to fifteen atoms, and advisably from four to eleven atoms including the ether oxygens.

Some of the polyester-ether copolymers suitable for use in this invention may be formed by more or less conventional condensation polymerization techniques in which cyclic polycarboxylic acids or their anhydrides, such as phthalic acid or phthalic anhydride, polyalkylene glycols, such as di-, tri- and tetra-propylene or ethylene glycols, and polyols, such as glycerol or trimethylolpropane, are reacted together to form a copolymer with ester and ether linkages. The reactants are intimately admixed and heated for as long as necessary, under an inert gas sparge at a temperature of about 100° C. to 250° C., the water of condensation being continuously removed. Transesterification of lower alkyl esters of dibasic acids with polyether glycols is also feasible.

Useful polymers also result from reaction of mixtures of cyclic polycarboxylic acids or their anhydrides with diglycolic acid, alkylene glycols and polyols, by conventional polycondensation methods. In such copolymers the acyclic polyether segments are replaced by units formed by reacting diglycolic acid with lower aliphatic glycols, such as ethylene or propylene glycol. One typical copolymer of this type can be produced by reacting together four mols of phthalic anhydride, two mols of diglycolic acid, two mols of propylene glycol, and one mole of glycerol.

While such standard techniques allow the preparation of high-molecular-weight polymers with low functionality, and of low-molecular-weight polymers having high functionality, they are unsuitable for preparation of useful, high-molecular-weight high-functionality polymers, resulting in the preparation of gels when the latter polymers are attempted. It is particularly difficult to prepare copolymers with low hydroxyl number, low acid number and high functionality by conventional techniques. Thus, standard polycondensation reactions known to the art cannot be used to prepare the high-molecular-weight, high-functionality polyester-ether copolymers of suitably low melt viscosity and hydroxyl number which constitute the preferred embodiment of this invention.

The preferred method of producing the stiff-backbone, acid-terminated copolymers of suitably low melt viscosity and hydroxyl number is by our novel process described in our copending application Serial No. 168,062. In this process the copolymers are produced by an addition-type copolymerization of an epoxide or cyclic ether having oxygen located in a heterocyclic ring of four to six members and a cyclic anhydride in the presence of a polymerization starter of the group consisting of polyols, organic acids and inorganic acids, at a temperature of about 70° C. to about 210° C. for a period sufficient for the reactants to polymerize and at a pressure of at least the vapor pressure of the system at the reaction temperature. The process is specifically illustrated herein in some of the working examples.

Cyclic anhydrides which are considered very useful for production of stiff-backbone polyester-ether copolymers of this invention are phthalic anhydride, tetrahydrophthalic anhydride, tetrachlorophthalic anhydride, tetrabromophthalic anhydride, endomethylene tetrahydrophthalic anhydride, and 1,4,5,6,7,7-hexachlorobicyclo-(2,2,1)-5-heptene-2,3-dicarboxylic anhydride, hereinafter called chlorendic anhydride. Bicyclic adducts derived from maleic anhydride and cyclic aliphatic diolefins, such as 1,2-divinyl cyclohexane, are also useful. Saturated aliphatic cyclic acid anhydrides, such as succinic anhydride, can be admixed in small amounts with the above anhydrides.

Representative epoxides are ethylene oxide, propylene oxide, and 1,2-butylene oxide. Other useful cyclic ethers are trimethylene oxide and 3,3-dimethyl trimethylene oxide.

Useful polymerization starters are polyols such as glycerol, sorbitol, pentaerythritol, trimethylolpropane, trimethylolethane, and lactose. Compounds such as sucrose mono-oleate are also useful. Useful acidic polyfunctional starters are trimellitic acid, pyromellitic acid, citric acid, phosphoric acid and phosphorous acid.

To prepare essentially pure acid-terminated copolymers a molar ratio of epoxide to anhydride of about 1.5 to about 1.7 is preferably used. If lower ratios are employed, free anhydride remains in the polymer, and higher ratios are undesirable since they lead to hydroxyl end groups.

This novel method is particularly advantageous in preparing high-molecular-weight, high-functionality copolymers. The functionality of the polymer is the same as that of the starter and the final molecular weight and the number of end groups per kilogram of polymer is determined by the proportions of starter employed in the reaction mixture. Because of the addition-type nature of the polymerization process, polymers are obtained with a very narrow molecular-weight distribution. This allows high molecular weights to be built up without any risk of gelation.

In forming the cured resin compositions according to this invention the stiff-backbone acid-terminated polyester-ether copolymer and the compound containing two or more reactive epoxide groups are mixed together and are caused to react in the conventional manner. From about one equivalent to about two equivalents of epoxy compound per acid equivalent are generally used.

The compositions of this invention employ the same epoxy resins already known to the art. Some of the polyepoxides which can be used are the diglycidyl ether of 2,2-bis(4-hydroxyphenyl) propane, the diglycidyl ether of bis(4-hydroxyphenyl) methane, glycidyl ethers of glycerol, glycidyl ethers of tris (hydroxylphenyl) propane, glycidyl ethers of tetrakis(hydroxyphenly)ethane, epoxy-terminated polymeric reaction products of epichlorohydrin and 2,2-bis(4-hydroxyphenyl) propane, polymeric reaction products of epichlorohydrin and phenol-formaldehyde-type polymers, dicyclopentadiene diepoxide, vinylcyclohexene diepoxide, limonene diepoxide, and 3,4-epoxy-6-methyl-cylohexylmethyl-3,4-epoxy - 6 - methyl-cyclohexylcarboxylate. Especially useful are the various reaction products from epichlorohydrin and 2,2-bis(4-hydroxylphenyl) propane. Epoxidized polybutadiene derivatives sold commercially under the trade name "Oxirons" have also been found useful.

The cured resin compositions are produced by reacting the polyester-ether copolymer with the polyfunctional epoxide under conditions of temperature and pressure usually employed to react epoxides with carboxyl-functional materials. Heat and catalysts can be used as warranted. Various tertiary amines such as n-ethyl morpholine and triethanolamine and alkali metal salts of organic acids may be used as catalysts. Organic borate compounds, such as tricresyl borate, are also useful as catalysts. Diluents, fillers and other resins may be admixed with the compositions of this invention as desired.

The stiff-backbone chain structure of the copolymers of the present invention contributes in large measure to the dimensional stability of the final cured product. These copolymers thus assume in part the function performed by the epoxy resin in known formulations, and high weight percentages of the polyester-ether copolymer component can be combined with relatively small weight percentages of the epoxy resin. The aliphatic polyether segments between the ring structures in the polymer chain provide just enough flexibility to assure that the final product is tough instead of brittle. Thus the large content of ring structures coupled with a well-balanced proportion of flexibilizing aliphatic segments provides for toughness and hardness in the final cured product notwithstanding the low epoxy content. Typically, the cured copolymerpolyepoxide products will contain less than 40 percent by weight of the epoxy resin, and frequently less than 20 percent, while providing products having good hardness and toughness.

The number and nature of the end groups of the polymeric component which is combined with the epoxy component in the resin composition has considerable influence on the properties of the final product. In order to have a satisfactory cure with a diepoxide, the polymeric component should have an average of at least three and preferably four or more acidic end groups per polymer molecule. The cure time is decreased as the functionality of the polymeric component is increased. We have found that this effect shows no tendency to level off, even to a functionality of about 20.

Copolymers containing hydroxyl end groups result in poorer properties of the cured product. Since hydroxyl groups react much more slowly with epoxide groups than do carboxyl groups, hydroxyl end groups are essentially inert under normal curing conditions. Thus, it is the average number of acidic end groups per polymer molecule and not the number of total end groups which is important in determining the curing characteristics of the resin system. Any hydroxylic end groups can conveniently be converted into carboxyl end groups by reaction with an acid anhydride, prior to reaction with the epoxy-functional component.

Not only the number, but also the nature of the carboxylic end groups has a profound effect on the rate of cure. Aliphatic carboxyl groups, such as those of succinic and adipic half-esters, generally react only slowly with epoxy groups. The aromatic carboxyl groups, such as those of phthalic half-esters react at a faster rate but have an appreciable reaction rate with epoxides only at an elevated temperature. The carboxyl groups attached to halogen-substituted residues, such as those of tetrachlorophthalic and chlorendic half esters, are much more reactive with epoxides, and frequently show an appreciable reaction rate at slightly elevated temperatures or even at room temperature. Therefore the curing rate of the polyester-ether copolymer with the polyepoxide can be varied by proper selection of the anhydride reactant used in preparing the polyester-ether copolymer.

Because of the special qualities inherent in the polyester-ether copolymers described in this invention, cured resins are obtained which are non-resilient and tough and which give rigid laminates, hard coatings, and rigid solid castings. Such desirable resins are obtained with the use of not more than about 40 percent by weight of polyepoxide based on the weight of the combined mixture of polyester-ether copolymer and polyfunctional epoxide. In many instances the content of the epoxy resin can be as low as 30 percent, and sometimes even as low as 20 percent or less of the total weight of the resin, with the products retaining good stiffness and toughness as well as other desirable properties. The exact weight percentage is determined by the molecular weight of the polyepoxide and the number of epoxide groups per molecule, that is, the equivalent weight. In this respect it is instructive to compare representative resin formulations known to the art with the formulations of the present invention. Such a comparison is presented in Table I.

We have also found that many anhydrides have an appreciable solubility in the polyester-ether copolymers described in this invention, and that such a mixture leads to a more rapid and complete cure. Thus, a mixture of an anhydride and a stiff-backbone acid-terminated polyester-ether copolymer may be used in conjunction with a polyepoxide to prepare the cured resin. Such an admixture may be made by simple admixture of the polymer and the acid anhydride, or it may be prepared by using a low ratio of epoxide to acid anhydride in the preparation of the copolymer by the process described in our copending application.

The following examples are presented to illustrate the invention.

TABLE I.—COMPARISONS OF CURED RESINOUS COMPOSITIONS

| Resin Components | | Properties of Cured Resin | Reference |
|---|---|---|---|
| Epoxide, wt. percent | Curing Agent, wt. percent | | |
| Epon RN-34; 67 | Polyester A, acid no. 235; 33 | Hard, brittle | (1). |
| Epon 1064; 70 | Polyester B, acid no. 336; 30 | Hard, tough | (1). |
| Epon 1001; 80 | Polyester B, 20 | Very hard, tough | (1). |
| Epon 1064; 70 | Polyester C, acid no. 354; 30 | Very hard, very tough | (1). |
| Diepoxide; 88–95 | Aliphatic polyamine; 5–12 | Hard, tough | (2). |
| Diepoxide; 75–87 | Aromatic diamine, 13–25 | ___do___ | (3). |
| Epon 826; 70–75 | Phthalic anhydride, 25–30 | ___do___ | (4). |
| Epon 826; 45 | Chlorendic anhydride; 55 | ___do___ | (5). |
| Epoxy resin; 60 | Polyamide, amine value 300; 40 | ___do___ | (6). |
| Epoxy resin; 40 | Polyamide, amine value 300; 60 | Softer, flexible | (6). |
| Epoxy resin; 25 | Polyamide, amine value 300; 75 | Rubbery | (6). |
| Epon 826; 22 | Polyester-ether copolymer; 78 | Hard, tough | Example 2. |
| Unox 201; 34 | Polyester-ether copolymer; 66 | ___do___ | Example 5. |
| Vinylcyclohexene diepoxide, 16 | Polyester-ether copolymer; 84 | ___do___ | Example 18. |

[1] U.S. 2,683,131, W. E. Cass, July 6, 1954.
[2] Lee and Neville, "Epoxy Resins," McGraw-Hill, pp. 64, 67.
[3] Ibid, p. 101, 104, 105.
[4] Ibid, p. 118.
[5] Ibid, p. 137.
[6] Ibid, p. 171.

Polyester A, derived from ethylene glycol and phthalic anhydride.
Polyester B, derived from pentaerythritol and phthalic anhydride.
Polyester C, derived from glycerol and phthalic anhydride.

*Example 1*

This reaction illustrates the preparation of a cured resin composition by the reaction of a carboxyl-terminated polyether-ester copolymer and dicyclopentadiene diepoxide.

Phthalic anhydride, 30.8 g., sorbitol, 1.9 g., and 1,2-butylene oxide, 22.6 g., are sealed together in a heavy-walled glass tube and heated to 160° C. for two hours with intermittent shaking. The resulting polymer is very viscous and of pale yellow color. The acid number is 75, indicating that a small amount of excess phthalic anhydride is present in the product.

The above polymer, 4.65 g., and dicyclopentadiene diepoxide, 1.0 g., are warmed on a hotplate, thoroughly mixed, and heated at 162° C. for 24 hours. The resulting product is semi-solid at elevated temperatures and is a hard solid at room temperature. The diepoxide content of the cured composition is 18 percent by weight.

*Example 2*

This example illustrates the preparation of a cured resin composition by the reaction of a carboxyl-terminated polyester-ether copolymer and the diglycidyl ether of 2,2-bis(4-hydroxyphenyl)propane.

"Epon 826" (a diglycidyl ether of 2,2-bis(4-hydroxyphenyl)propane, 1.0 g., and the polyester-ether copolymer prepared in Example 1, 3.6 g., are heated and stirred together. The mixture is heated at 162° C. for 20 hours. The mixture gels after 4 hours of heating, and is a stiff rubber after 20 hours at 162° C. The product is a clear, yellow, hard, tough, solid at room temperature. The diepoxide content of the mixture is 22 percent on a weight basis.

*Example 3*

This example illustrates the use of a tertiary amine catalyst in the preparation of a cured resin composition.

The polyester-ether copolymer prepared in Example 1, 3.6 g., "Epon 826," 1.0 g., and 2 drops of N-methylmorpholine are heated and thoroughly mixed. The mixture is then heated for 6 hours at 162° C. After 10 minutes of heating a gel has formed. The final product is similar to that in Example 2, but is darker in color and is somewhat softer.

*Example 4*

This example illustrates the preparation of a cured resin composition by the reaction of a stiff-backbone carboxyl-terminated polyester-ether copolymer and 3,4-epoxy-6-methylcyclohexylmethyl - 3,4 - epoxy - 6 - methylcyclohexylmethyl - 3,4 - epoxy - 6 - methylcyclohexylcarboxylate (Unox 201).

The same polyester-ether copolymer, 4.2 g., and "Unox 201," 1.3 g., are heated together on a hotplate and thoroughly mixed. The mixture is heated at 162° C. for 330 minutes. After one hour of heating a gel has formed. The final product is a very stiff rubber at 162° C. At room temperature the product is a hard, moderately tough solid. The diepoxide content of the product is 24 percent on a weight basis.

*Example 5*

This example illustrates the preparation of another cured composition with "Unox 201."

Phthalic anhydride, 55.0 g., glycerol, 4.2 g., and propylene oxide, 31.9 g., are sealed together in a heavy-walled glass tube and heated at 162° C. for two hours. The polymer is very viscous at room temperature and has an acid number of 108, indicating that about 10–15 percent of the phthalic anhydride used in the reaction mixture remains unreacted.

The above polymer, 3.45 g., and "Unox 201," 1.75 g., are warmed on a hotplate and thoroughly mixed. The mixture is then heated at 162° C. for 6 hours. A gel forms after about 20 minutes of heating and a stiff rubber results in one hour. After 6 hours the product is a very stiff rubber at 162° C. At room temperature the product is a hard, tough solid. The diepoxide content of the product is 34 percent by weight.

*Example 6*

This example illustrates the preparation of a cured resin composition by the reaction of a carboxyl-terminated stiff-backbone polyester-ether copolymer with a diluent-modified aromatic diglycidyl ether.

The copolymer of Example 5, 7.4 g., and "Epon 815," 2.6 g., are warmed together on a hotplate and thoroughly mixed. The mixture is then heated at 160° C. for 22 hours. A gel forms after five hours and becomes a moderately stiff gum at 160° C. after 22 hours. The product is hard and stiff at room temperature. The total content of epoxy functional reactant is 26 percent by weight.

*Example 7*

This example illustrates the attempted preparation of a cured resin composition by reaction of "Unox 201" with a stiff-backbone polyester-ether copolymer prepared with glycerol as starter and having a high content of hydroxyl end groups.

Phthalic anhydride, 60.4 g., glycerol, 4.3 g., and propylene oxide, 46.9 g., are sealed together in a heavy-walled glass tube and heated at 160° C. for two hours. The product has an acid number of 42 and a calculated hydroxyl number of 26.

The above polymer, 10.2 g., and "Unox 201," 2.3 g., are mixed and heated together at 160° C. for 4 hours. The product is fluid at 160° C., and is a soft solid at room temperature.

In another attempt the above polymer, 8.8 g., is heated with "Unox 201," 3.2 g., for 23 hours at 160° C. The product is a fluid at elevated temperature and a soft solid at room temperature.

*Example 8*

This example illustrates the preparation of a cured resin composition from a polyester-ether copolymer based on ethylene oxide, phthalic anhydride, and sorbitol.

Phthalic anhydride, 17.9 g., sorbitol, 2.2 g., and ethylene oxide, 13.7 g., are sealed together in a heavy-walled glass tube and heated at 105° C. for three hours and at 140° C. for 80 minutes. The acid number of the product is 67, indicating that the hydroxyl number is about 40 to 50.

The above polymer, 7.3 g., and "Unox 201," 2.6 g., are heated and mixed together and then cured at 160° C. for 80 minutes. The product is a rubber at oven temperature, and at room temperature it has rheological properties similar to cold asphalt.

This polymer yields a cured product with a diepoxide because of its high functionality, despite the fact that a relatively high proportion of hydroxyl chain ends is present.

*Example 9*

This example illustrates the preparation of a cured resin composition from a stiff-backbone polyester-ether based on trimethylene oxide.

Phthalic anhydride, 11.25 g., sorbitol, 1.5 g., and trimethylene oxide, 10.2 g., are sealed together in a heavy-walled glass vessel and heated at 140° C. for 90 minutes. The product has an acid number of 142 and little free anhydride is present.

The above polymer, 5.6 g., and "Unox 201," 3.5 g., are heated together on a hot plate and thoroughly mixed. The mixture is then heated at 140° C. for 95 minutes. A gel forms after about 25 minutes of heating and becomes a stiff rubber at 140° C. at the end of the cure. The cooled product is stiff, but not brittle. It can be bent and indented with a sharp instrument without causing breakage.

*Example 10*

This example illustrates the preparation of a very rigid, chemically resistant cured resin composition from a polyester-ether copolymer containing neopentyl structural segments.

Phthalic anhydride, 26.5 g., glycerol, 2.5 g., and 3,3-dimethyloxetane, 27.2 g., are sealed together in a heavy-walled glass tube and heated at 163° C. for four hours. The polymeric product has an acid number of about 80, and is extremely viscous when cooled to room temperature.

The above polymer, 7.0 g., and "Epon 826", 2.0 g., are heated together on a hotplate and thoroughly mixed. The mixture is then heated at 170° C. for 12 hours. The product is a stiff rubber at oven temperature and is a hard solid at room temperature. The product is extremely resistant to attack by organic solvents, caustic solution and dilute acids. The product also shows evidence of greater stability toward oxidation than known epoxy-cured resinous compositions.

*Example 11*

This example illustrates the preparation of a resin composition which is self-extinguishing when ignited.

Phthalic anhydride, 50.1 g., sorbitol, 5.3 g., tetrabromophthalic anhydride, 18.7 g., and propylene oxide, 32.9 g., are sealed together in a heavy-walled glass vessel, and heated at 164° C. for four hours. The product is a very viscous fluid having an acid number of about 100.

The above polymer, 8.1 g., and "Unox 201", 3.6 g., are warmed together on a hotplate and thoroughly mixed. The mixture is then heated at 165° C. for four hours. The cooled product is rigid and hard, and is immediately self-extinguishing when removed from a flame.

Example 12

This example illustrates the use of added dichloromaleic anhydride to speed the curing reaction of a stiff-backbone, carboxyl-terminated polyester-ether copolymer with a diepoxide.

A polyester-ether copolymer based on phthalic anhydride, sorbitol and 1,2-butylene oxide and with an acid number of 71 is used. The polymer, 5.2 g., dichloromaleic anhydride, 1.0 g., and "Epon 826", 2.3 g., are heated together and quickly mixed. The mixture is then heated at 155° C. for 10 hours. This mixture cures much morerapidly than that described in Example 2.

Example 13

This example illustrates the use of pyromellitic dianhydride to provide a more tightly crosslinked system than can be obtained by the reaction of only a diepoxide with a carboxyl-terminated polyester-ether copolymer.

The same copolymer as in Example 12, 4.5 g., and pyromellitic dianhydride, 0.9 g., are thoroughly milled together. Then "Unox 201", 2.7 g., is added to the mixture and stirred in. The resulting mixture is heated at 165° C. for four hours. The cured product is considerably more rigid than that prepared in Example 4.

Example 14

This example illustrates the use of a polyester-ether copolymer having strongly acidic end groups in the preparation of a resin composition cured with a diepoxide.

Phthalic anhydride, 14.5 g., sorbitol, 2.0 g., and propylene oxide, 16.1 g., are placed in a thick-walled glass tube and heated at 161° C. for three hours. The resulting polymer has an acid number of one, and a hydroxyl number of 112. This polymer, 11.3 g., is added to dichloromaleic anhydride, 3.9 g., and the mixture is heated at 136° C. for three hours. The resulting product has an acid number of about 84.

The two-stage, strongly acidic, carboxyl-terminated copolymer, 5.6 g., and "Unox 201", 1.8 g., are heated together on a hot plate and quickly mixed. The mixture is then heated at 140° C. for two hours. Gelation is very rapid and the cure appears to be satisfactory after a two-hour period.

Example 15

This example illustrates the preparation of a flexible, stiff, cured resin composition from an acid-terminated, polyester-ether copolymer and an epoxidized butadiene.

The polyester-ether copolymer prepared in Example 5, 6.6 g., and "Oxiron 2000" (an epoxidized polybutadiene sold by FMC Corporation), 2.6 g., are warmed on a hotplate and mixed. The mixture is heated at 155° C. for 45 minutes, at which time it has formed a stiff rubber at oven temperature. When cooled, the casting was stiff and moderately hard, but could be slowly bent through a large angle.

Example 16

This example illustrates the preparation of a cured resin composition resulting from the reaction of a diepoxide with a polyester-ether copolymer based on diglycolic acid and isophthalic acid.

Isophthalic acid, 161.3 g., diglycolic acid, 67.7 g., glycerol, 21.6 g., and 1,3-butanediol, 66.3 g., are placed into a three-necked flask. The reaction mixture is heated with stirring at 180–200° C. for several hours while a nitrogen purge is maintained. Heating is continued until the water of condensation ceases to be evolved. The acid number of the polymer product is about 160.

The above polymer, 8.3 g., is mixed with "Epon 826", 5.0 g., and heated at 170° C. for 26 hours. The product is a stiff, rigid solid at room temperature.

Example 17

This example illustrates the preparation of a cured resin composition from an acid-terminated polyester-ether prepared by conventional techniques and a bis-epoxide.

The polyester was prepared by a standard esterification procedure. Glycerol, 90 g., diethylene glycol, 317 g., and phthalic anhydride, 889 g., are charged to a 3-liter flask. The contents are heated to 180–190° C. with stirring, and the water of condensation is distilled off. The reaction takes about ten hours. The product is a viscous liquid and has an acid number of 141.

The above ester, 8.6 g., and "Epon 826", 5.9 g., are mixed together and heated at 162° C. for 24 hours. The product is a rubber at 162° C. and it is a hard solid at room temperature.

Example 18

This example illustrates the preparation of a cured resinous composition having a very low epoxide content.

The polyester-ether copolymer prepared in Example 1, 5.7 g., and vinylcyclohexene diepoxide, 1.1 g., are warmed and thoroughly mixed. The mixture is then heated at 160° C. for 24 hours. The resulting product is a stiff gel at oven temperature and a tough, hard solid at room temperature. The diepoxide content of the final product is only 16 percent by weight.

Example 19

This example illustrates the preparation of a cured resin surface coating by the reaction of a polyester-ether copolymer with a diepoxide.

The copolymer is similar to that described in Example 1, but has an acid number of 71. This polymer, 6.4 g., and "Unox 201," 2.1 g., are dissolved in enough methylisobutyl ketone to give a solution having a suitable viscosity for coating. This solution is then flow-coated onto a plate-glass panel. The solvent is allowed to evaporate for two hours, and the panel is then heated at 161° C. for three hours. The cured coating is clear, hard, and tough.

Example 20

This example illustrates the preparation of a cured resin glass-fiber laminate based on a polyester-ether copolymer and a diepoxide.

The copolymer is similar to that in Example 1, but has an acid number of 71. This polymer, 38.1 g., and "Epon 826," 10.9 g., are melted together to make a fluid mixture. This mixture is then poured over a 4-inch-square piece of thick woven glass fabric and worked in with a straight edge. When the fabric is thoroughly wetted, it is placed between 6-inch-square steel press plates, and the assembly is heated at 180° C. for ten hours at 100 p.s.i. pressure. The product is a tough, stiff, translucent panel.

Example 21

This example illustrates the preparation of a non-resilient epoxy foam.

The polyester-ether copolymer prepared in Example 5, 5.3 g., "Oxiron 2001," (an epoxidized polybutadiene), 6.2 g., fluorotrichloromethane, 0.7 g., and 3 drops of Silicone Fluid 199 (a glycol-silicone copolymer used as a surface-active agent) are mixed together. Then 0.4 g. of tricresyl borate is stirred in. The mixture slowly foams, and is cured at 120° C. for thirty minutes. The product is a semi-rigid foam that does not shrink on cooling.

We claim:

1. A cross-linked nonresilient, infusible resinous composition consisting essentially of from 16 percent to 60 percent by weight of organic polyepoxide residues bonded by means of ester linkages to stiff-backbone polyester-ether copolymer residues through chains thereof that carried terminal carboxyl groups which reacted with the epoxide groups to form the ester linkages, said polyester-ether copolymer residues being derived from polyester-ether copolymers of the general formula

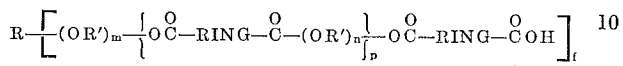

in which RING is a cyclic hydrocarbon radical selected from the group consisting of 1,2-phenylene, 3,4,5,6-tetrahydro-1,2-phenylene, 3,4,5,6-tetrachloro-1,2-phenylene, 3,4,5,6-tetrabromo-1,2-phenylene, 1,4,5,6,7,7-hexachloro-(2,2,1)-bicyclo-2,3-heptenylene-5, and bicyclo-(2,2,1)-2,3-heptenylene-5, R represents the residue of a polymerization starter selected from the group consisting of aliphatic polyols, organic carboxylic acids, hydroxycarboxylic acids and monomeric inorganic acids containing phosphorous, $f$ is the functionality of the polymer and has a minimum value of at least two, R' is a lower alkylene radical selected from the group consisting of lower 1,2-alkylene radicals and 1,3-alkylene radicals, $m$ is an integer varying from zero to about ten, $n$ is an integer varying from one to about fifteen and having an average value of at least about 2.0, and $p$ is an integer having a minimum value of zero and having an average value of greater than zero, the molar ratio of R' to RING in said copolymer being at least about 1.5.

2. A nonresilient, infusible resin composition according to claim 1 having in an aliphatic chain segment between ester groups, at least one of which is attached to RING, an average of four to fifteen atoms including ether oxygens.

3. A nonresilient, infusible resin composition according to claim 1 in which the RING units constitute a minimum of 15 percent by weight and not more than 75 percent by weight of the polyester-ether copolymer.

4. A nonresilient, infusible resin composition according to claim 1 in which R' is selected from the group consisting of 1,2-ethylene, 1,2-propylene and 1,2-butylene.

5. The composition of claim 1 in which said polyester-polyether copolymer has a uniform functionality $f$ of at least three.

6. A nonresilient, cross-linked infusible resinous composition which consists essentially of residues of (1) an organic polyepoxide, (2) a cyclic carboxylic acid anhydride, and (3) a carboxyl-terminated polyester-ether copolymer of the general formula:

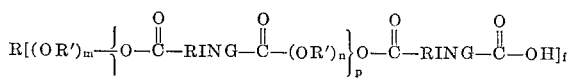

in which RING is a cyclic hydrocarbon radical selected from the group consisting of 1,3-phenylene, 1,2-phenylene, 3,4,5,6-tetrahydro-1,2-phenylene, 3,4,5,6-tetrachloro-1,2-phenylene, 3,4,5,6-tetrabromo-1,2-phenylene, 1,4,5,6,7,7-hexachloro-(2,2,1)-bicyclo-2,3-heptenylene-5, and bicyclo-(2,2,1)-2,3-heptenylene-5, R represents the residue of a polymerization starter selected from the group consisting of aliphatic polyols, organic carboxylic acids, hydroxycarboxylic acids and monomeric inorganic acids containing phosphorous, $f$ is the functionality of the polymer and has a minimum value of at least two, R' is a lower alkylene radical selected from the group consisting of lower 1,2-alkylene radicals and 1,3-alkylene radicals, $m$ is an integer varying from zero to about ten, $n$ is an integer varying from one to about fifteen and having an average value of at least about 2.0, and $p$ is an integer having a minimum value of zero and having an average value of greater than zero, the molar ratio of R' to RING in said copolymer being at least about 1.5, and said polyepoxide constituting from about 16 to 60 percent by weight of the total composition, and the said anhydride representing not more than 30 percent by weight of the combined weight of the said anhydride and the said polyester-ether copolymer.

7. A nonresilient, infusible resinous composition having not more than 60 percent by weight of organic polyepoxide residues bonded by means of ester linkages to stiff-backbone polyester-ether copolymer residues through chains thereof that carried terminal carboxyl groups which reacted with the epoxide groups to form the ester linkages, said polyester-ether copolymer residues containing the essential repeating units of the formula

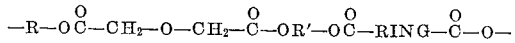

in which RING is a cyclic hydrocarbon radical selected from the group consisting of 1,3-phenylene, 1,2-phenylene, 3,4,5,6-tetrahydro-1,2-phenylene, 3,4,5,6-tetrabromo-1,2-phenylene, 3,4,5,6-tetrachloro-1,2-phenylene, 1,4,5,6,7,7-hexachloro-(2,2,1)-bicyclo-2,3-heptenylene-5, and bicyclo-(2,2,1)-2,3-heptenylene-5, R and R' are alkylenes of at least two carbons, said polyester-ether copolymer residues being characterized further by being derived from polyester-ether copolymers having an average molecular weight of at least 200 and up to about 2000 per chain end, a functionality of at least two, an acid number of less than 250 and containing from about 1.0 to about 5.0 gram mols of RINGS per kilogram of polyester-ether copolymer.

8. A nonresilient, infusible resin composition according to claim 7 in which the polyester-ether copolymer has a diglycolic acid content of not more than 35 percent by weight.

9. The process of producing a nonresilient, cross-linked infusible resinous composition which comprises reacting an organic polyepoxide with a carboxyl-terminated polyester-ether copolymer of the general formula:

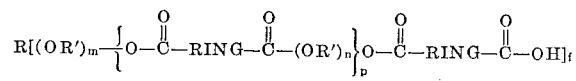

in which RING is a cyclic hydrocarbon radical selected from the group consisting of 1,3-phenylene, 1,2-phenylene, 3,4,5,6-tetrahydro-1,2-phenylene, 3,4,5,6-tetrachloro-1,2-phenylene, 3,4,5,6-tetrabromo-1,2-phenylene, 1,4,5,6,-7,7-hexachloro-(2,2,1)-bicyclo-2,3-heptenylene-5, and bicyclo-(2,2,1)-2,3-heptenylene-5, R represents the residue of a polymerization starter selected from the group consisting of aliphatic polyols, organic carboxylic acids, hydroxycarboxylic acids and monomeric inorganic acids containing phosphorous, $f$ is the functionality of the polymer and has a minimum value of at least two, R' is a lower alkylene radical selected from the group consisting of lower 1,2-alkylene radicals and 1,3-alkylene radicals, $m$ is an integer varying from zero to about ten, $n$ is an integer varying from one to about fifteen and having an average value of at least about 2.0, and $p$ is an integer having a minimum value of zero and having an average value of greater than zero, the molar ratio of R' to RING in said copolymer being at least about 1.5, and said polyepoxide constituting from about 16 percent to about 60 percent by weight of the combined weight of the polyepoxide-polyester-ether copolymer mixture.

10. The process of claim 9 in which R' is selected from the group consisting of 1,2-ethylene, 1,2-propylene, and 1,2-butylene.

11. The process of claim 9 in which said polyester-polyether copolymer contains a cyclic carboxylic acid anhydride in admixture, the said anhydride representing not more than 30 percent by weight of the admixture.

12. The process of claim 9 in which the stiff-backbone, carboxyl-terminated polyester-ether copolymer resin component is characterized by having in an aliphatic chain segment between ester groups, at least one of which is attached to RING, an average of four to fifteen atoms including ether oxygens, and by having RING units constituting a minimum of 15 percent by weight and not more than 75 percent by weight.

13. The process of claim 9 in which the polyepoxide component constitutes not more than 45 percent by weight of the resulting resin composition.

14. The process of claim 9 in which the polyepoxide component constitutes not more than 30 percent by weight of the resulting resin composition.

References Cited by the Examiner

UNITED STATES PATENTS

| | | | |
|---|---|---|---|
| 2,609,357 | 9/1952 | Koroly | 260—75 |
| 2,947,712 | 8/1960 | Belanger et al. | 260—78.4 |
| 2,985,616 | 5/1961 | McGary | 260—75 |
| 3,089,863 | 5/1963 | Hicks et al. | 260—75 |
| 3,133,905 | 5/1964 | Snyder et al. | 260—75 |
| 3,170,833 | 2/1965 | Noyes | 260—75 |

LEON J. BERCOVITZ, *Primary Examiner.*

R. W. GRIFFIN, *Assistant Examiner.*